United States Patent [19]

Hewitt

[11] Patent Number: 4,923,492

[45] Date of Patent: May 8, 1990

[54] CLOSED SYSTEM REFRIGERATION USING A TURBOEXPANDER

[76] Inventor: J. Paul Hewitt, P.O. Box 79034, Houston, Tex. 77279

[21] Appl. No.: 354,860

[22] Filed: May 22, 1989

[51] Int. Cl.$^5$ ................................................ F25J 3/00
[52] U.S. Cl. .......................................... 62/11; 62/87; 62/93
[58] Field of Search .................... 62/9, 11, 86, 87, 88, 62/93

[56] References Cited

U.S. PATENT DOCUMENTS

| | | | |
|---|---|---|---|
| 2,494,120 | 1/1950 | Ferro, Jr. | 62/87 |
| 3,932,159 | 1/1976 | Goldsberry | 62/87 |
| 3,992,891 | 11/1976 | Pocrnja | 62/88 |
| 4,490,985 | 1/1985 | Wells | 62/86 |

Primary Examiner—Ronald C. Capossela
Attorney, Agent, or Firm—Kenneth H. Johnson

[57] ABSTRACT

The present invention utilizes a turboexpander coupled with a compressor in place of the Joules-Thomson expansion valve in a conventional refrigeration to achieve higher efficiency. More specifically the refrigeration is used in removing condensable hydrocarbons or chemical vapors from air which has been contaminated during loading and unloading at bulk plants. The more efficient turboexpansion cycle allows the use of saturated lower aliphatic hydrocarbons, such as ethane as refrigerant, the use of which would be precluded from normal Joules-Thomson expansion cycles. The turboexpander work is used to drive a compressor which partially recompresses the expanded refrigerant gas, providing an essentially isentropic expansion. Because the turboexpander and the compressor operate on the same fluid, the mass flows through both are equal thereby alleviating control and loading problems.

21 Claims, 1 Drawing Sheet

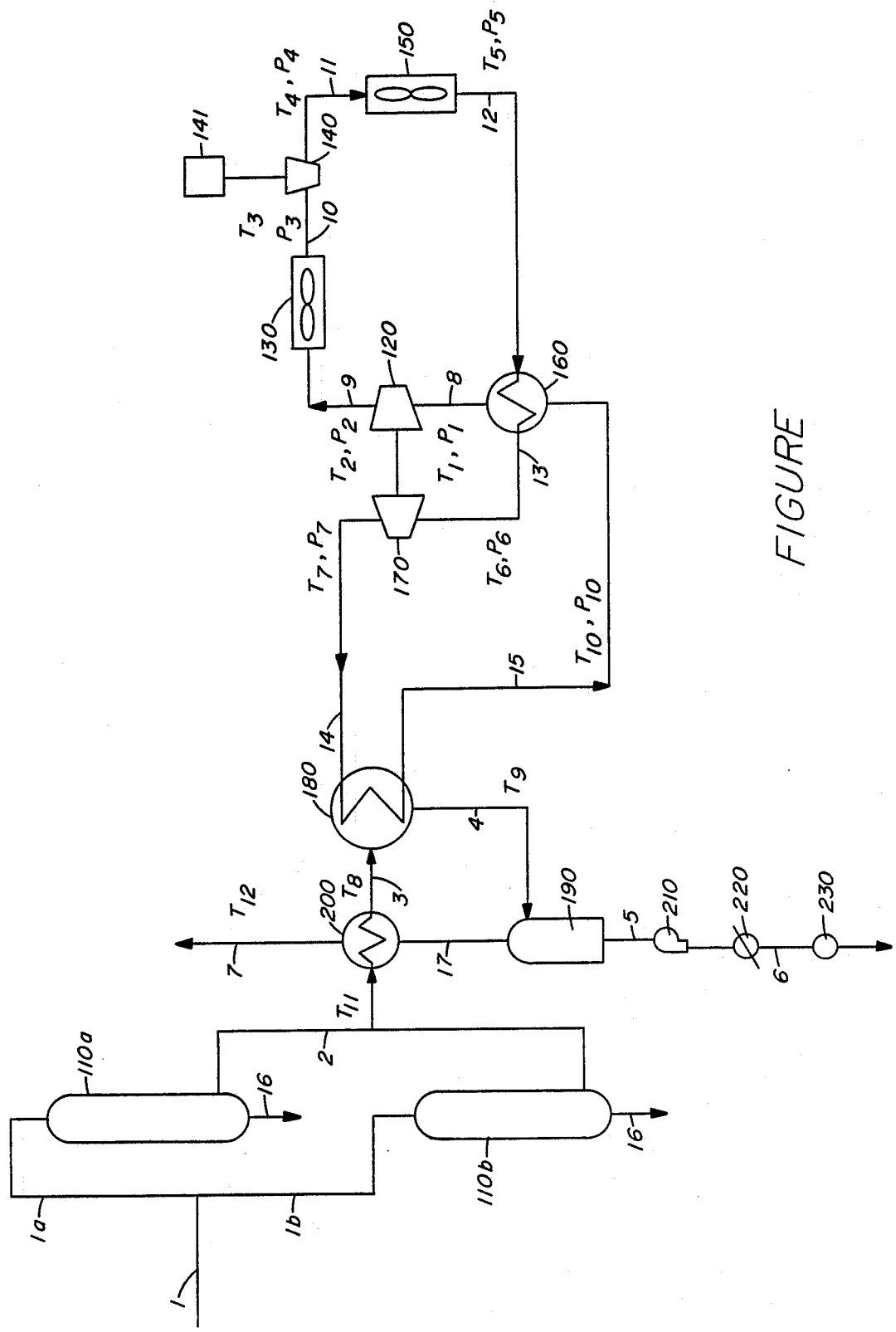
FIGURE

CLOSED SYSTEM REFRIGERATION USING A TURBOEXPANDER

BACKGROUND OF THE INVENTION

1. Field of the invention

The present invention relates to improved closed cycle refrigeration systems, particularly for removing excessive hydrocarbons or other chemicals from air-vapor mixtures by condensation.

2. Related information

Environmental concerns have led to a requirement for the reduction of chemical vapors, particularly hydrocarbons emitted into the atmosphere from every possible source. One of the sources targeted are bulk loading and unloading terminals. In these terminals a vapor recovery system is used to gather the air containing hydrocarbons or other vapors which are emitted during loading and unloading operations. The vapors are commonly separated from the air by refrigeration of the air-vapor mixture to cryogenic temperatures. The refrigeration systems can reduce "condensable" hydrocarbons or other condensable materials in the vented air to acceptable levels, i.e., loss than 80 mg/l.

The cryogenic temperatures required, i.e., about $-100°$ F., necessitate efficient refrigeration to achieve the separation. Since the total amount of refrigeration, expressed in tons (1 ton=12,000 BTU removed), is small when compared to large scale plants, such as ice plants and gas liquefaction plants, less efficient closed refrigeration cycles can be used with the common fluorocarbon refrigerants such as Freon 12.

With less efficient refrigerants, greater circulation and more compression power is required. Cascade refrigeration, using two refrigerants—one to cool the other—is an alternative. The most commonly used closed refrigeration cycle in these smaller scale plants is the compression of the refrigerant followed by cooling at the higher pressure and expansion across a Joules-Thomson expansion valve, the cycle being used to cool both refrigerants in the cascade refrigeration system. However, with the advent of concerns about damage to the atmosphere attributed to the fluorocarbons, these are being banned or expected to be banned in commercial operations.

A turboexpander may be used when the refrigerant is at a "free" higher pressure. The most common use of the turboexpander is in the natural gas processing industry. More specifically it is used in the demethanizer separation column when there is a free pressure drop, that is, the entering gas from the well or pipeline is at a pressure above that necessary for the separation. Generally the entering gas mixture is first pre-cooled by heat exchange with the exiting methane from the tower and the condensed liquids separated in a separator. The gas, containing mostly methane, is expanded across a turbine to the tower operating pressure and thus chilled. An enlarged top portion of the column acts as a separator for the expanded gas. To achieve an essentially isentropic expansion of the gas the turbine is coupled to a drive shaft which may have a brake applied or drive a compressor which partially compresses the product methane toward the desired pipeline pressure. The brake is required to vary the load on the turboexpander and match it with the compressor load. A situation where the mass flow in both the turboexpander and compressor is proportional is desirable for control purposes. Although the demethanizer is the most common application of the industrial turboexpander, its use in a closed refrigeration system has been proposed in "Introduction To Chemical Engineering Thermodynamics", Smith and Van Hess, Second Edition, McGraw-Hill Book Company, Inc., New York, 1959, pp.301-303.

Adaptation of the turboexpander to the closed cycle system of refrigeration for smaller scale plants could achieve greater efficiency and allow use of less efficient refrigerants.

SUMMARY OF THE INVENTION

Briefly the present invention utilizes a turboexpander in place of the Joules-Thomson expansion valve in a conventional refrigeration system to achieve higher efficiency. The turboexpander replaces the Joules-Thomson expansion valve, which is essentially adiabatic, with a turbine which takes work out of the expansion making it essentially isentropic. The isentropic expansion allows for a lower temperature of the expanded refrigerant at the same pressure reduction. More specifically the refrigeration is used in removing condensable hydrocarbons or chemicals from air which has been contaminated during loading and unloading at bulk plants. The more efficient turboexpansion cycle allows the use of saturated aliphatic hydrocarbons, such as ethane, propane or butane, as refrigerant, the use of which would be precluded from normal Joules-Thomson expansion cycles. Preferably the refrigerant is ammonia, nitrogen or a saturated lower aliphatic hydrocarbon, more preferably having $C_2$ to $C_6$ carbons.

Basically the process of the present invention comprises:

(a) compressing a refrigerant gas at temperature $T_1$ and pressure of $P_1$ to a temperature $T_2$ and pressure $P_2$ in a first compressor;

(b) cooling said compressed refrigerant gas to a temperature of $T_5$, $T_5 > T_1$, in a condenser such that substantially all of said refrigerant gas is condensed to a refrigerant liquid;

(c) expanding said refrigerated liquid to a pressure of $P_7$, $P_7 < P_6$, across a turboexpander, said turboexpander driving a second compressor to remove work and providing an essentially isentropic expansion of said refrigerant liquid to a refrigerant gas and cooling said refrigerant gas to a cryogenic temperature of $T_7$, $T_7 < T_6$;

(d) indirectly exchanging heat from said mixture at a temperature of $T_8$ to said refrigerant gas in a vapor chiller to increase the temperature of said refrigerant gas to about $T_{10}$ and cooling said mixture to a temperature of $T_9$, $T_8 < T_{10}$, thereby condensing substantially all of said hydrocarbons in said mixture;

(e) compressing said refrigerant gas at a temperature $T_3$ and pressure $P_3$ to a pressure of $P_4$ and temperature $T_4$ in said second compressor, $P_1 < P_2 < P_4$, and returning said refrigerant to the inlet of said first compressor for recycle;

(f) venting said air less substantially all of said hydrocarbons to the atmosphere; and (g) recovering said condensed hydrocarbons.

BRIEF DESCRIPTION OF THE DRAWING

The FIGURE depicts a simplified flow diagram of the present invention as used in vapor removal from air.

DETAILED DESCRIPTION OF THE PREFERRED EMBODIMENT

In one embodiment of the present invention ethane is used as the refrigerant in a closed loop compression, turboexpander cycle to cool air containing hydrocarbons and condense the hydrocarbons for removal. The FIGURE depicts a flow diagram of this application with dashed lines surrounding the refrigeration cycle.

The air-hydrocarbon vapor mixture containing water is collected in header 1 and passed through flow lines 1a or 1b to one of two dehydrators 110a or 110b to remove the water from the vapor. The water must be removed to prevent freezing and plugging of the lines at the temperatures used. The dehydrators 110a and 110b contain a common gas desiccant such as a molecular sieve and are arranged for parallel flow so that the sieve in one may be regenerated while the other is in service. Water is removed from the dehydrators to disposal line 16.

The now dry vapor mixture at substantially atmospheric pressure and temperature is next passed to a precooler 200 via flow line 2 where it is cooled to a temperature $T_8$ of about 0° F. by indirect heat exchange with the cold vented air. The vapor mixture is then chilled to a temperature $T_9$ of about $-130°$ F. in vapor chiller 180 wherein about 90+ percent of the condensable hydrocarbons are liquified by indirect heat exchange with the cold refrigerant gas from the refrigerant section. The liquid vapors, containing essentially no water, are recovered in separator 190 and sent to storage through flow line 5 by pump 210. Check valve 220 in flow line 6 prevents backflow of vapors and vapor lock of pump 210. Meter 230 is provided to monitor the flow rate of recovered vapors.

The air effluent from the separator 190 is passed via line 17 first to vapor precooler 200 to absorb additional heat from the vapor mixture by indirect heat exchange therewith. The air at temperature $T_{12}$ of about 60° F. may then be vented to the atmosphere via line 7 containing less than about 35 mg/l of condensable hydrocarbons which is well within current EPA limits.

Now turning to the refrigeration cycle, cooling is provided for vapor chiller 180 by the compression-turboexpansion cycle of refrigerant gas, such as ethane. The refrigerant gas is first compressed in recompressor 120 to a temperature $T_2$ of about 170° F. and a pressure $P_2$ of about 100 psig. The refrigerant gas is then carried by flow line 9 to aerial condenser 130 where it is cooled to temperature $T_3$ of about 110° F. at constant pressure, the refrigerant gas is then compressed in a second stage recompressor 140 to a temperature $T_4$ of about 200° F. to a pressure $P_4$ of about 450 psig. The refrigerant gas is then carried by flow line 11 to aerial condenser 150 where it is cooled to temperature $T_5$ to about 110° F. at constant pressure, thereby condensing substantially all of the refrigerant to a liquid. The refrigerant is partially cooled by the returning refrigerant gas via line 15, by indirect heat exchanged in heat exchanger 160° to about 0° F. The refrigerant liquid is then passed via flow line 13 to the inlet side of turboexpander 170 where the refrigerant is expanded essentially isentropically to pressure $P_7$ of about 10 psig and thereby cooled to a cryogenic temperature $T_7$ of less than $-100°$ F. The exiting low pressure refrigerant gas is used to chill the air-vapor mixture via line 14 by indirect heat exchange in vapor chiller 180. The transfer of heat to the refrigerant in chiller 180 raises the temperature of the refrigerant gas to temperature $T_{10}$, about $-100°$ F. It is then passed via line 15 to heat exchanger 160 to remove any liquid by indirect contact with the liquid refrigerant in line 12 which is at $T_1$ 60° F. and $P_1$ 10 psig prior to partially recompressing it to a pressure $P_2$ of about 100 psig in compressor 120 driven by turboexpander 170. The partially recompressed refrigerant gas is then passed to the suction side of second stage recompressor 140 (driven by motor 141) via flow line 10 where the cycle begins anew.

The turboexpander is able through substantially isentropic expansion, which produces work, to cool the refrigerant gas to a cryogenic temperature more easily than a simple Joules-Thomson expansion. Thus the use of the turboexpander will allow a gas to be cooled to $-100°$ F. using less horsepower than would be required in a conventional cascade type refrigeration system. Additionally, the closed loop system provides the same mass flow through both expander 170 and compressor 120 alleviating loading and control problems.

Generally the process of the present invention comprises:

(a) compressing a refrigerant gas from temperature $T_1$ and pressure $P_1$ to temperature $T_2$ and pressure $P_2$ in a first stage of compression (120), (b) cooling said compressed refrigerant gas to temperature $T_3$ and pressure $P_3$ in a first condenser (130), (c) compressing said refrigerant gas from said temperature $T_3$ and pressure $P_3$ to temperature $T_4$ and pressure $P_4$ in a second stage of compression (140), (d) cooling said compressed refrigerant gas to temperature $T_5$ and pressure $P_5$ in a second condenser (150), such that substantially all of said gas is condensed to a refrigerant liquid, (e) expanding said refrigerant liquid to a pressure of $P_7$, and temperature of $T_7$, across a turboexpander (170), driving the first stage compressor (120) to remove work and providing an essentially isentropic expansion of said refrigerant liquid to a cryogenic refrigerant gas, (f) indirectly exchanging heat from a air-vapor mixture at temperature $T_8$ with refrigerant at temperature $T_7$ ($T_8 > T_7$) in a chiller (180), cooling said air-vapor mixture to a temperature of $T_9$, thereby, condensing substantially all of said hydrocarbons or chemical vapors in said mixture, (g) recompressing said refrigerant gas at temperature $T_1$ and pressure $P_1$ in said first stage compressor (120), (h) venting said air less substantially all of said hydrocarbons or other chemical vapors to the atmosphere and (i) recovering said condensed vapors.

Preferably, said air-vapor mixture at temperature $T_9$ with entrained condensed hydrocarbon or chemical vapors passes to a separator (190) in which the condensed vapors are accumulated, said air emissions vent through the inlet interchanger (200) exchanging heat from the inlet air-vapor mixture at temperature $T_{11}$, prior to venting to atmosphere and the accumulated condensed hydrocarbon or chemical vapors from the separator (190) are discharged to storage.

In addition it is preferably to indirectly exchange heat from said refrigerant liquid at said temperature of $T_5$ and pressure $P_5$ with said refrigerant gas at temperature $T_{10}$ and pressure $P_{10}$ in an interchanger (160), thereby cooling said refrigerant liquid to temperature $T_6$ and pressure $P_6$ and warming said refrigerant gas to temperature $T_1$ and pressure $P_1$.

The temperatures and pressures are given for a particular system as an exemplification and for illustration purposes and are not intended to limit the scope of the invention which is defined by the appended claims.

The invention claimed is:

1. A system for removing substantially all of the hydrocarbons or chemical vapors from an air-hydrocarbon or chemical vapor mixture, comprising:
   (a) a dehydration means for removing any water contained within said mixture;
   (b) a vapor chiller in fluid connection with said dehydration means to condense substantially all of said hydrocarbons or chemicals in said mixture by indirect heat exchange with a refrigerant gas at a cryogenic temperature;
   (c) a drain to remove substantially all of said condensed hydrocarbons or chemicals from said vapor chiller;
   (d) a vent means to remove said air less substantially all of said hydrocarbons coming from said vapor chiller;
   (e) a first compressor to compress said refrigerant gas;
   (f) a condenser in fluid connection with the outlet of said first compressor to condense substantially all of said refrigerant liquid;
   (g) a turboexpander in fluid connection with said condenser to reduce the pressure of and expand said refrigerant liquid back to a refrigerant gas thereby reducing the temperature of said refrigerant gas to a cryogenic temperature;
   (h) fluid connection between said turboexpander outlet and said vapor chiller wherein said refrigerant gas is heated by indirect heat exchange with said mixture thereby cooling said mixture; and
   (i) a second compressor driven by said turboexpander in fluid connection with the refrigerant gas outlet of said vapor chiller to partially compress said refrigerant gas thereby removing work and providing and essentially isentropic expansion across said turboexpander, the outlet of said second compressor being in fluid connection with the inlet of said first compressor.

2. The system of claim 1 wherein the cryogenic temperature of said refrigerant gas is below $-40°$ F.

3. The system of claim 2 wherein said mixture is cooled in said vapor chiller to a temperature of below $-40°$ F.

4. The system of claim 3 wherein said air when vented contains 80 mg/l or less of condensable hydrocarbons.

5. The system of claim 1 wherein said dehydration means comprises a pair of vessels in parallel, each of said vessels containing a molecular sieve, said vessels being arranged such that the molecular sieve in one vessel can be regenerated while the other vessel is operating.

6. The system of claim 1 further comprising a first heat exchanger between said dehydration means and said vapor chiller and piped so as to indirectly exchange heat from said mixture to said vented air.

7. The system of claim 6 further comprising a second heat exchanger piped so as to indirectly exchange heat from said refrigerant gas heated in said chiller to said refrigerant liquid.

8. A process for removing hydrocarbons from an air-chemical vapor mixture comprising :
   (a) compressing a refrigerant gas at temperature $T_1$ and pressure of $P_1$ in a first compressor to a temperature $T_2$ and pressure $P_2$;
   (b) cooling said compressed refrigerant gas to a temperature of $T_5$, $T_5 > T_1$, in a condenser such that substantially all of said refrigerant gas is condensed to a refrigerant liquid;
   (c) expanding said refrigerated liquid to a pressure of $P_7$, $P_7 < P_6$, across a turboexpander, said turboexpander driving a second compressor to remove work and providing an essentially isentropic expansion of said refrigerant liquid to a refrigerant gas and cooling said refrigerant gas to a cryogenic temperature of $T_7$, $T_7 < T_6$;
   (d) indirectly exchanging heat from said mixture at a temperature of $T_8$ to said refrigerant gas in a vapor chiller to increase the temperature of said refrigerant gas to about $T_{10}$ and cooling said mixture to a temperature of $T_9$, $T_8 < T_{10}$, thereby condensing substantially all of said hydrocarbons in said mixture;
   (e) compressing said refrigerant gas at a temperature $T_3$ and pressure $P_3$ to a pressure of $P_4$ and temperature $T_4$ in said second compressor, $P_1 < P_2 < P_4$, and returning said refrigerant to the inlet of said first compressor for recycle;
   (f) venting said air less substantially all of said hydrocarbons to the atmosphere; and
   (g) recovering said condensed hydrocarbons.

9. The process of claim 8 wherein $T_1$ is about 60° F., $T_2$ is about 170° F., $T_3$ is about 110° F., $T_4$ is about 200° F., $T_5$ is about 110° F., $T_6$ is about 0° F., $T_{10}$ is about $-100°$ F., $P^1$ is about 10 psig, $P_2$ and $P_3$ are about 100 psig and $P_4$ is about 450 psig.

10. The process of claim 8 wherein said mixture is dried to remove any water before chilling.

11. The process of claim 9 wherein said vented air contains about 80 mg/l or less of condensable hydrocarbons.

12. The process of claim 9 wherein said refrigerant is a saturated aliphatic hydrocarbon.

13. The process of claim 12 wherein said refrigerant is a saturated $C_2$ to $C_6$ aliphatic hydrocarbon.

14. The process of claim 13 wherein said refrigerant is ethane.

15. The process of claim 13 wherein said refrigerant is butane.

16. The process of claim 13 wherein said refrigerant is propane.

17. The process according to claim 8 wherein the refrigerant is nitrogen.

18. The process according to claim 8 wherein the refrigerant is ammonia.

19. A process for removing hydrocarbons from an air-hydrocarbon vapor mixture comprising :
   (a) compressing a refrigerant gas from temperature $T_1$ and pressure $P_1$ to temperature $T_2$ and pressure $P_2$ in a first stage of compression;
   (b) cooling said compressed refrigerant gas to temperature $T_3$ and pressure $P_3$ in a first condenser;
   (c) compressing said refrigerant gas from said temperature $T_3$ and pressure $P_3$ to temperature $T_4$ and pressure $P_4$ in a second stage of compression in a second compressor;
   (d) cooling said compressed refrigerant gas to temperature $T_5$ and pressure $P_5$ in a second condenser, such that substantially all of said gas is condensed to a refrigerant liquid;

(e) expanding said refrigerant liquid to a pressure of $P_7$, and temperature of $T_7$, across a turboexpander, driving the first stage compressor to remove work and providing an essentially isentropic expansion of said refrigerant liquid to a cryogenic refrigerant gas;

(f) indirectly exchanging heat from a air-vapor mixture at temperature $T_8$ with refrigerant at temperature $T_7$, $T_8 > T_7$ in a chiller, cooling said air-vapor mixture to a temperature of $T_9$, thereby, condensing, substantially all of said hydrocarbons in said mixture;

(g) recompressing said refrigerant gas at temperature $T_1$ and pressure $P_1$ in said first stage compression;

(h) venting said air less substantially all of said hydrocarbons to the atmosphere and (i) recovering said condensed vapors.

20. The process according to claim 19 wherein heat from said refrigerant liquid at said temperature of $T_5$ and pressure $P_5$ is indirectly exchanged with said refrigerant gas at temperature $T_{10}$ and pressure $P_{10}$ in an interchanger, thereby cooling said refrigerant liquid to temperature $T_6$ and pressure $P_6$ and warming said refrigerant gas to temperature $T_1$ and pressure $P_1$.

21. The process according to claim 19 wherein said air-vapor mixture at temperature $T_9$ with entrained condensed hydrocarbon or chemical vapors passes to a separator in which the condensed vapors are accumulated, said air emissions vent through the inlet interchanger exchanging heat from the inlet air-vapor mixture at temperature $T_{11}$, prior to venting to atmosphere and the accumulated condensed hydrocarbon or chemical vapors from the separator are discharged to storage.

* * * * *

UNITED STATES PATENT AND TRADEMARK OFFICE
CERTIFICATE OF CORRECTION

PATENT NO. : 4,923,492

DATED : May 8, 1990

INVENTOR(S) : J. Paul Hewitt

It is certified that error appears in the above-identified patent and that said Letters Patent is hereby corrected as shown below:

The title page should be deleted and substitute the attached title page showing the illustrative figure.

The Drawing Sheet, consisting of one drawing figure, should be added, as shown on the attached page.

Signed and Sealed this

Nineteenth Day of May, 1992

Attest:

DOUGLAS B. COMER

Attesting Officer      Acting Commissioner of Patents and Trademarks

United States Patent [19]

Hewitt

[11] Patent Number: 4,923,492
[45] Date of Patent: May 8, 1990

[54] CLOSED SYSTEM REFRIGERATION USING A TURBOEXPANDER

[76] Inventor: J. Paul Hewitt, P.O. Box 79034, Houston, Tex. 77279

[21] Appl. No.: 354,860

[22] Filed: May 22, 1989

[51] Int. Cl.$^5$ .................................................. F25J 3/00
[52] U.S. Cl. ........................................... 62/11; 62/87; 62/93
[58] Field of Search ................... 62/9, 11, 86, 87, 88, 62/93

[56] References Cited

U.S. PATENT DOCUMENTS

| | | | |
|---|---|---|---|
| 2,494,120 | 1/1950 | Ferro, Jr. | 62/87 |
| 3,932,159 | 1/1976 | Goldsberry | 62/87 |
| 3,992,891 | 11/1976 | Pocrnja | 62/88 |
| 4,490,985 | 1/1985 | Wells | 62/86 |

Primary Examiner—Ronald C. Capossela
Attorney, Agent, or Firm—Kenneth H. Johnson

[57] ABSTRACT

The present invention utilizes a turboexpander coupled with a compressor in place of the Joules-Thomson expansion valve in a conventional refrigeration to achieve higher efficiency. More specifically the refrigeration is used in removing condensable hydrocarbons or chemical vapors from air which has been contaminated during loading and unloading at bulk plants. The more efficient turboexpansion cycle allows the use of saturated lower aliphatic hydrocarbons, such as ethane as refrigerant, the use of which would be precluded from normal Joules-Thomson expansion cycles. The turboexpander work is used to drive a compressor which partially recompresses the expanded refrigerant gas, providing an essentially isentropic expansion. Because the turboexpander and the compressor operate on the same fluid, the mass flows through both are equal thereby alleviating control and loading problems.

21 Claims, 1 Drawing Sheet

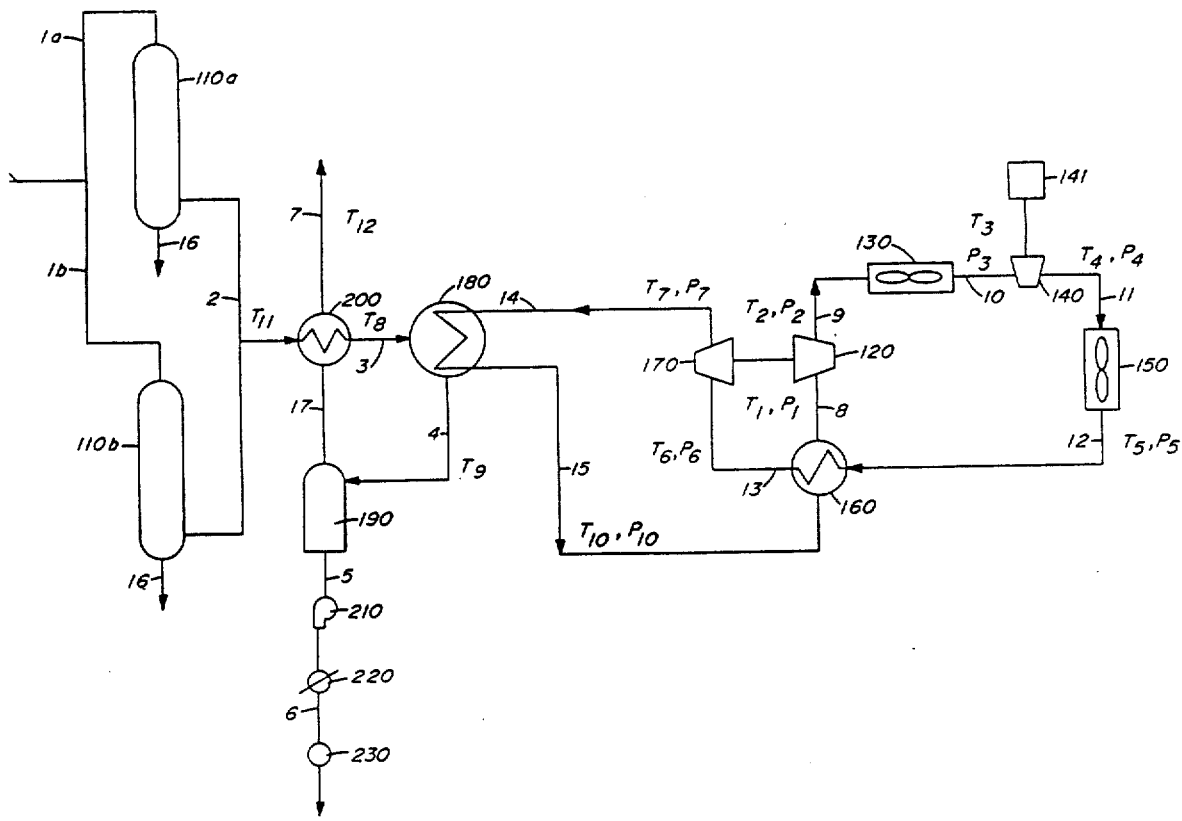

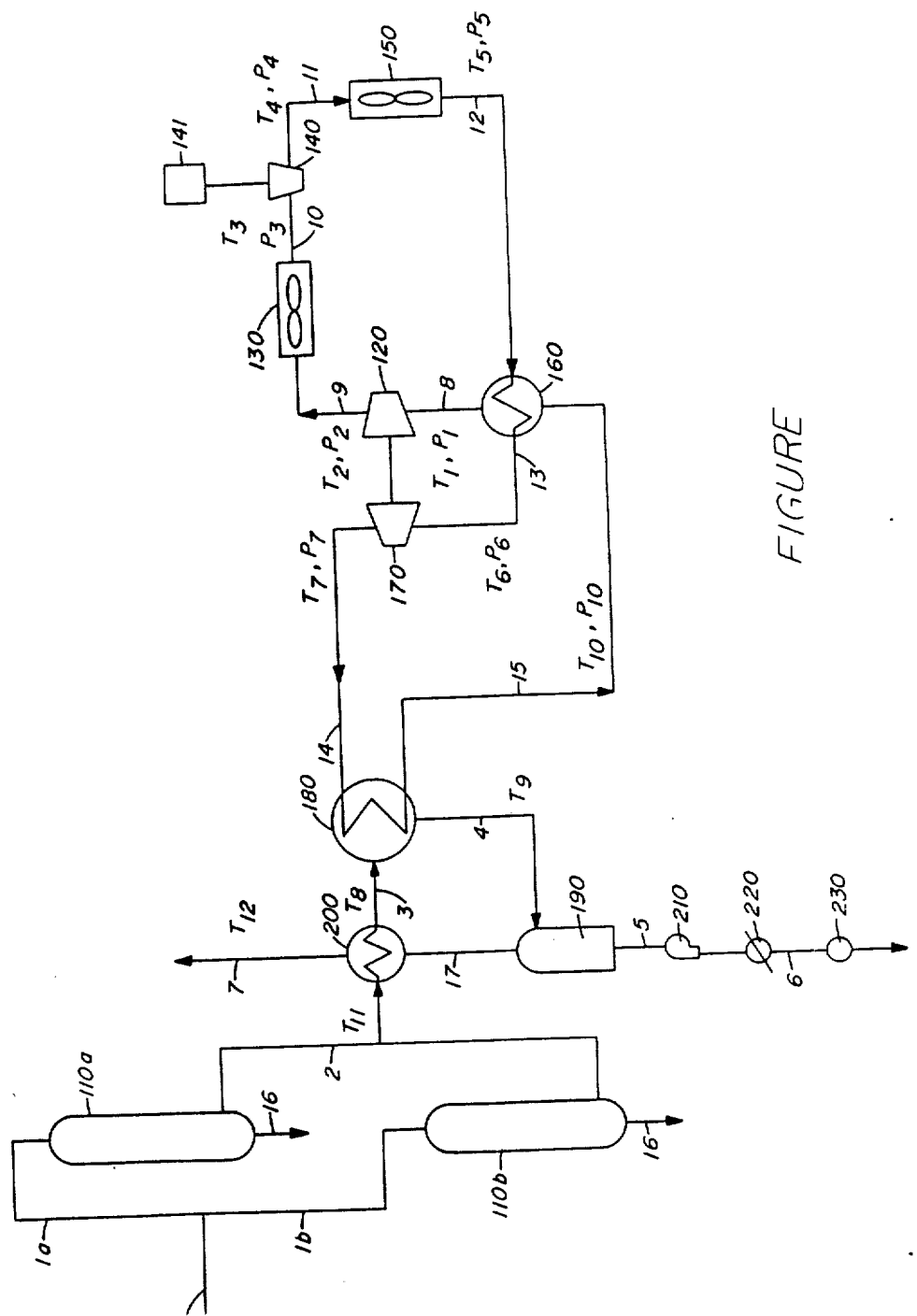
FIGURE

UNITED STATES PATENT AND TRADEMARK OFFICE
CERTIFICATE OF CORRECTION

PATENT NO. : 4,923,492
DATED : 05/08/90
INVENTOR(S) : J. Paul Hewitt

It is certified that error appears in the above—identified patent and that said Letters Patent is hereby corrected as shown below:

Column 2, Line 34 reads "$T_1$" but should read ---$T_3$---

Column 2, Line 35 reads "$P_1$" but should read ---$P_3$---

Column 2, Line 35 reads "$T_2$" but should read ---$T_4$---

Column 2, Line 36 reads "$P_2$" but should read ---$P_4$---

Column 2, Line 38 reads "$T_1$" but should read ---$T_3$---

Column 2, Line 42 reads "$P_6$" but should read ---$P_5$---

Column 2, Line 47 reads "$T_6$" but should read ---$T_5$---

Column 2, Line 52 reads "$T_8 < T_{10}$" but should be deleted

Column 2, Line 56 reads "$T_3$" but should read ---$T_1$---

Column 2, Line 56 reads "$P_3$" but should read ---$P_1$---

Column 2, Line 56 reads "$P_4$" but should read ---$P_2$---

Column 2, Line 57 reads "$T_4$" but should read ---$T_2$---

Column 4, Line 4 reads "which is" but should read ---exiting---

Claim 8, Column 6, Line 1 reads "$T_1$" but should read ---$T_3$---

Claim 8, Column 6, Line 2 reads "$P_1$" but should read ---$P_3$---

Claim 8, Column 6, Line 3 reads "$T_2$" but should read ---$T_4$---

UNITED STATES PATENT AND TRADEMARK OFFICE
CERTIFICATE OF CORRECTION

PATENT NO. : 4,923,492
DATED : 05/08/90
INVENTOR(S) : J. Paul Hewitt

It is certified that error appears in the above—identified patent and that said Letters Patent is hereby corrected as shown below:

Claim 8, Column 6, Line 3 reads "$P_2$" but should read ---$P_4$---

Claim 8, Column 6, Line 5 reads "$T_1$" but should read ---$T_3$---

Claim 8, Column 6, Line 9 reads "$P_6$" but should read ---$P_5$---

Claim 8, Column 6, Line 14 reads "$T_6$" but should read ---$T_5$---

Claim 8, Column 6, Line 19 reads "$T_8$" < $T_{10}$" but should be deleted

Claim 8, Column 6, Line 23 reads "$T_3$" but should read ---$T_1$---

Claim 8, Column 6, Line 23 reads "$P_3$" but should read ---$P_1$---

Claim 8, Column 6, Line 23 reads "$P_4$" but should read ---$P_2$---

Claim 8, Column 6, Line 24 reads "$T_4$" but should read ---$T_2$---

Claim 9, Column 6, Line 30 reads "$T_1$" but should read ---$T_3$---

Claim 9, Column 6, Line 31 reads "$T_2$" but should read ---$T_4$---

Claim 9, Column 6, Line 31 reads "$T_3$" but should read ---$T_1$---

Claim 9, Column 6, Line 31 reads "$T_4$" but should read ---$T_2$---

Claim 9, Column 6, Line 32 reads "$T_6$" is about 0°F but should be deleted

Claim 9, Column 6, Line 33 reads "$P^1$" but should read ---$P_1$---

Omitted 1 Drawing Sheet ---Add 1 Drawing Sheet